United States Patent [19]

Phillips et al.

[11] 4,059,847
[45] Nov. 22, 1977

[54] HOSE HAVING AN ELECTRICALLY CONDUCTIVE LAYER FOR DISSIPATING STATIC ELECTRICITY AND METHOD OF MAKING SAME

[75] Inventors: Alfred R. Phillips; Arthur D. Logan, both of Waynesville, N.C.

[73] Assignee: Dayco Corporation, Dayton, Ohio

[21] Appl. No.: 719,873

[22] Filed: Sept. 1, 1976

[51] Int. Cl.² .................... F16L 11/12; H05F 3/02
[52] U.S. Cl. .................................. 361/215; 138/125; 156/143; 156/149; 174/47
[58] Field of Search ............ 174/47, 68 A; 361/215; 87/1, 5-9; 138/103, 123-127; 156/143, 149; 338/214; 339/15, 16 R

[56] References Cited

U.S. PATENT DOCUMENTS

| | | | |
|---|---|---|---|
| 3,042,737 | 7/1962 | Brumbach et al. | 174/47 |
| 3,828,112 | 8/1974 | Johansen et al. | 174/47 |
| 3,907,955 | 9/1975 | Viennot | 174/47 X |

FOREIGN PATENT DOCUMENTS

| | | | |
|---|---|---|---|
| 918,349 | 2/1963 | United Kingdom | 138/125 |
| 1,017,331 | 1/1966 | United Kingdom | 138/125 |

*Primary Examiner*—Laramie E. Askin
*Attorney, Agent, or Firm*—Reuben Wolk

[57] ABSTRACT

A hose construction having means for dissipating static electricity and method of making same are provided and such hose construction comprises a polymeric inner tubular layer, a braided layer disposed against the inner tubular layer and comprised of a plurality of filaments, and an electrically conductive layer made of carbonaceous particles overlying the braided layer and including particles dispersed between the filaments, the particles are disposed in overlapped relation in layer form and enable relative movement therebetween while maintaining electrical continuity to enable dissipation of the static electricity. The hose construction may comprise an additional braided layer disposed around the electrically conductive layer and sandwiching the electrically conductive layer between the braided layers as well as a protective layer disposed around the entire hose construction.

20 Claims, 3 Drawing Figures

HOSE HAVING AN ELECTRICALLY CONDUCTIVE LAYER FOR DISSIPATING STATIC ELECTRICITY AND METHOD OF MAKING SAME

BACKGROUND OF THE INVENTION

Flexible hoses are widely used throughout industry to convey fluids under pressure. Such hoses typically are employed in the conveyance of volatile fluids, in conjunction with medical equipment, and in spray painting apparatus. In all of these applications it is desirable to provide such hoses with means for preventing the buildup of a charge of static electricity thereon during use.

Flexible hose constructions have been proposed previously which have electrical conductors disposed therealong for the purpose of dissipating static electricity; however, such hose constructions have various deficiencies. In particular, many of such previously proposed hose constructions employ metal conductors which when subjected to normal flexing movements of the hose are easily broken resulting in loss of electrical continuity and often resulting in damage to such hose constructions. Others of such previously proposed hose constructions utilize electrical conductors and associated components which are comparatively expensive; and, still others utilize electrically conductive materials which are compounded within component layers of such hose constructions resulting in substantial costs.

SUMMARY

It is a feature of this inventon to provide a simple and economical hose construction having means for dissipating static electricity wherein such hose construction overcomes the above-mentioned deficiencies.

Another feature of this invention is the provision of a method of making a hose construction of the character mentioned.

Another feature of this invention is the provision of a flexible hose construction comprising a polymeric inner tubular layer, a braided layer disposed against the inner tubular layer and comprised of a plurality of filaments, and an electrically conductive layer made of carbonaceous particles overlying the braided layer and including particles dispersed between the filaments; the particles are disposed in overlapped relation in layer form and enable relative movement therebetween during flexing of the hose construction while, maintaining electrical continuity to enable dissipation of the static electricity. The hose construction may comprise an additional braided layer disposed around the electrically conductive layer and sandwiching the electrically conductive layer between the braided layers as well as a protective layer disposed around the entire hose construction.

Accordingly, it is an object of this invention to provide an improved hose construction and method of making same having one or more of the novel features set forth above or hereinafter shown or described.

Other objects, features, details, uses, and advantages of this invention will be readily apparent from the embodiment thereof presented in the following specification, claims, and drawing.

BRIEF DESCRIPTION OF THE DRAWING

The accompanying drawing shows present preferred embodiments of this invention, in which.

DETAILED DESCRIPTION

Figure 2:
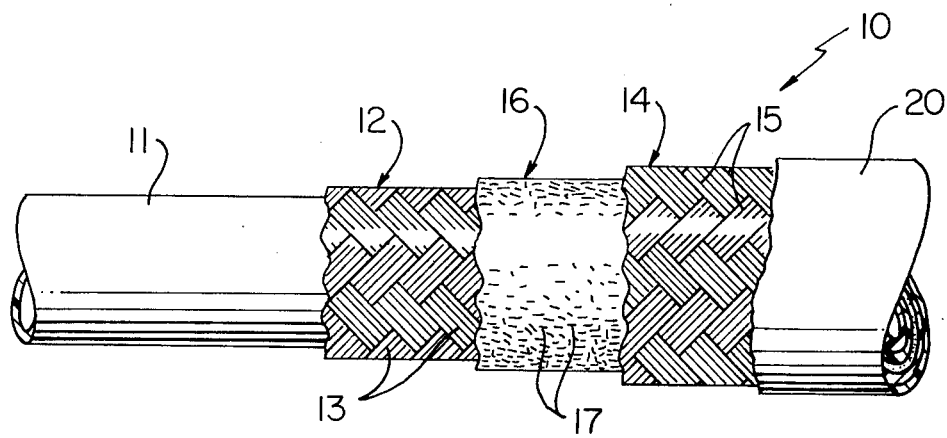
FIG. 2 is a view with parts in cross section, parts in elevation, and parts broken away particularly illustrating the detailed layers of one exemplary embodiment of the hose construction of this invention.

Reference is now made to FIG. 2 of the drawing which illustrates an exemplary hose construction of this invention which is designated generally by the reference numeral 10 and such hose construction is particularly adapted to be used in applications where it is desirable to prevent the buildup of charges of static electricity thereon and may be used to convey all types of fluids.

Figure 3:
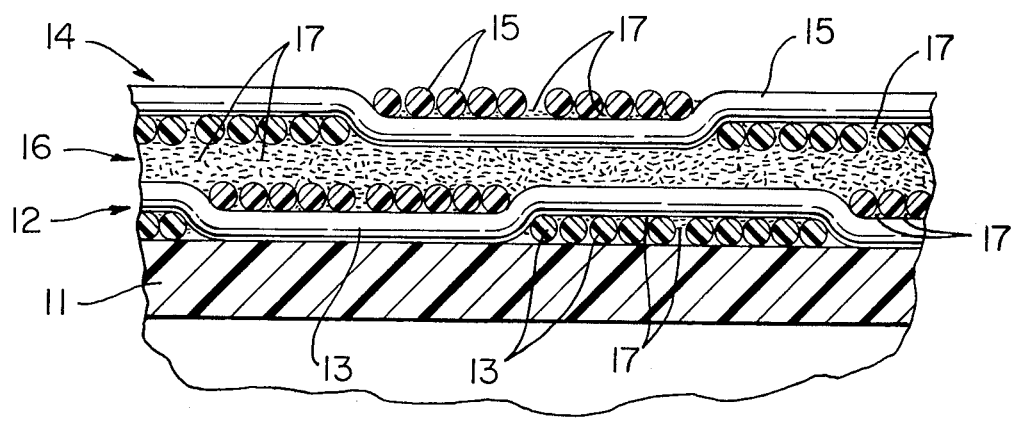
FIG. 3 is a greatly enlarged cross-sectional view of the hose construction of this invention minus its outer protective cover.

The hose construction 10 comprises a polymeric inner tubular layer 11 and a first braided layer 12 disposed against and around the inner tubular layer 11. The braided layer 12 is comprised of a first set of filaments 13. The hose construction 10 has a second braided layer 14 comprised of a second set of filaments 15 and an electrically conductive layer 16 made of carbonaceous particles 17 disposed between the braided layers 12 and 14 and between the filaments 13 and 15 respectively thereof and as illustrated in FIG. 3. Thus, the electrically conductive layer 16 is sandwiched between the braided layers 12 and 14 and the particles 17 are disposed in essentially overlapped relation and in sufficient quantity and sufficient radial thickness to define a substantially continuous layer thereof.

The particles 17 may be disposed free of adhesive means or adhesives therebetween yet during flexing movements of the hose construction 10 portions of the particles 17 remain in contact and maintain electrical continuity therebetween enabling layer 16 to serve as an electrically conductive layer and provide dissipation of static electricity in an efficient manner. The reason that the particles 17 remain in electrical contact without providing adhesive therebetween or adhering of such particles 17 to adjoining layers of the hose construction is not known; however, it is believed that such particles cooperate and overlap as "platelets", even though they may or may not have a plate-like configuration, in much the same manner as unattached fish scales would be disposed around a tubular layer of the hose construction 10.

Although it is not absolutely necessary, the hose construction 10 may also be provided with an outer layer 20 and the layer 20 is shown as being made of an elastomeric material. The layer 20 is a protective layer for the entire hose construction 10 and even though the particles 17 are not adhered to each other, the function of the elastomeric layer 20 is merely to protect the hose 10 and is not required to confine or hold the particles 17 within filaments 15 of the outer braided layer 14 for example.

The carbonaceous particles 17 are preferably sized particles of carbon black and may range in size between 4 and 10 microns. The preferred size is such that 90% of the particles 17 comprising the layer 16 and dispersed between the filaments 13 and 15 of the braided layers 12 and 14 respectively are below 7 microns.

Figure 1:
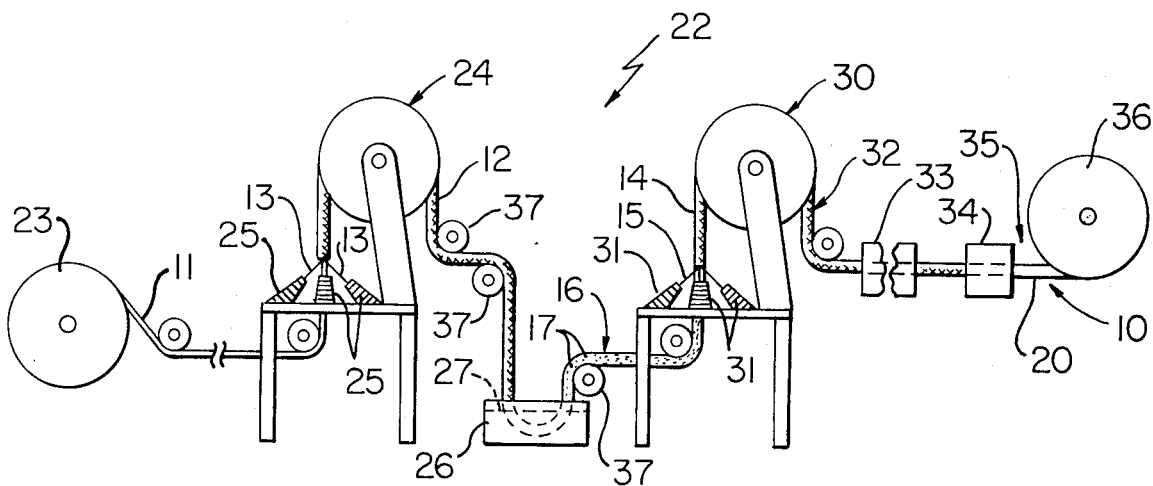
FIG. 1 is a primarily schematic view illustrating the hose of this invention and particularly illustrating the method of making same.

The hose construction 10 is preferably made employing the method illustrated in FIG. 1 of the drawing and such method is designated generally by the reference numeral 22. The method 22 illustrated in FIG. 1 comprises the steps of providing an inner polymeric tube 11 and such tube 11 may be provided from a continuous extruder or from a supply roll 23 thereof as shown, and supported for unwinding rotation. The tube 11 is passed through a first braiding machine or first braider 24 of known construction and the braider 24 has a plurality of spools 25 which carry the filaments 13 thereon and the filaments 13 are braided directly around and against the tube 11 to define the braided layer 12.

The tube 11 with the first braided layer 12 thereon is then passed through a tank or receptacle 26 containing a dispersion 27 therein and the dispersion 27 has carbonaceous particles 17 of carbon black, of the size previously described, dispersed therethrough. The passage of the tube 11 with layer 12 braided therearound through the dispersion 27 causes the carbon black particles 17 to define the electrically conductive layer 16 around the braided layer 12 and with particles 17 also being dispersed between the filaments 13 essentially as described previously in connection with FIG. 3 of the drawing.

The tube 11 with its braided layer 12 and still-wet electrically conductive layer 16 disposed therearound is then passed through a second braiding machine or second braider 30 having a plurality of spools 31 carrying filaments 15 and the filaments are braided around the layer 16 to define the outer braided layer 14. The resulting hose construction at this point in the process is designated by the reference numeral 32 and is comprised of the inner tubular layer 11, inner braided layer 12, outer braided layer 14, and the electrically conductive layer 16 made of carbonaceous particles 17 disposed and sandwiched between layers 12 and 14.

The hose construction 32 is then suitably dried and, in this example, such hose construction is passed through a heated environment in the form of a heat tunnel or oven 33.

The hose construction 32 then has the outer protective layer 20 disposed therearound; and, in this example, such layer is shown being defined as a seamless layer in a suitable extruding apparatus such as a cross-head extruder 34. The resulting hose construction is then suitably cooled as by ambient air cooling as shown at 35 whereupon the hose construction 10 is complete and may be wound on a suitable windup or supply roll 36.

A plurality of turn rolls are employed in the method of this invention to move the hose construction in the required manner and a few representative ones of such turn rolls are designated by the same reference numeral 37.

The bath or dispersion 27 which results in the formation of the electrically conductive layer 16 comprised of carbonaceous particles or particles of carbon black is preferably comprised of between 15 and 50 parts by weight of carbon black, 2 parts by weight of sulfonated surfactant, 0.2 parts by weight of potassium hydroxide, and the balance by weight being water.

Better results are obtained when the amount of carbon black is on the low side, i.e., close to 15 parts; and, in one application of this invention the dispersion 27 contained 16 parts by weight of carbon black, 2 parts by weight of sulfonated surfactant, 0.2 parts by weight of potassium hydroxide, and 81.8 parts by weight of water.

The uniform dispersal of the carbon black in an aqueous solution together with the surfactant and potassium hydroxide may be achieved using any suitable technique known in the art. Preferably an ordinary ball mill is employed to provide the dispersion 27 with uniformly dispersed particles 17 of carbon black.

The polymeric inner tubular layer 11 and outer protective layer 20 may be made of any suitable polymeric material including any synthetic plastic material or any natural or synthetic rubber compound. In this disclosure of the invention the layers 11 and 20 are shown cross-hatched in the drawing as being made of plastic and in one application of this invention these layers were made of nylon and polyurethane respectively.

The braided layers 12 and 14 and thus the respective filaments 13 and 15 comprising such layers may be made of any suitable filamentary material known in th art and may include natural or synthetic materials. In this disclosure of the invention, the filaments 13 and 15 are cross-hatched as being made of a plastic material and in the above-mentioned application where layers 11 and 20 were made of nylon and polyurethane respectively the filaments 13 and 15 and thus their layers 12 and 14 respectively were made of nylon.

In the illustration presented in FIG. 1 of the drawing the inner tube with its first braided layer is placed in contact with a dispersion in the form of a bath containing carbonaceous particles to form the electrically conductive layer 16; however, it is to be understood that the inner tube and its first braided layer may be sprayed with the dispersion 27 to form layer 16 employing a suitable spray nozzle, or the like.

While present exemplary embodiments of this invention, and methods of practicing the same, have been illustrated and described, it will be recognized that this invention may be otherwise variously embodied and practiced within the scope of the following claims.

What is claimed is:

1. A hose construction having means for dissipating static electricity and comprising, a polymeric inner tubular layer, a braided layer disposed against said inner tubular layer and comprised of a plurality of filaments, and an electrically conductive layer made of carbonaceous particles overlying said braided layer and including carbonaceous particles dispersed between said filaments, said particles being disposed in overlapped relation in layer form enabling relative movement therebetween while maintaining electrical continuity to enable dissipating said static electricity.

2. A hose construction as set forth in claim 1 in which said carbonaceous particles are within the range of 4 to 10 microns in size.

3. A hose construction as set forth in claim 2 in which said carbonaceous particles are particles of carbon black.

4. A hose construction having means for dissipating static electricity and comprising, a polymeric inner tubular layer, a first braided layer disposed against said inner tubular layer and comprised of a first set of filaments, a second braided layer disposed around said first braided layer and comprised of a second set of filaments, and an electrically conductive layer made of carbonaceous particles disposed between said braided layers and betwen the filaments of each of said braided layers, said particles being disposed in overlapped relation in layer form enabling relative movement therebetween during flexing movement of said hose construction yet maintaining electrical continuity to enable dissipation of said static electricity.

5. A hose construction as set forth in claim 4 in which said electrically conductive layer is made of said carbonaceous particles having a size ranging between 4 and 10 microns.

6. A hose construction as set forth in claim 5 in which said inner tubular layer is made of a seamless synthetic plastic material and said braided layers are made of synthetic plastic material.

7. A hose construction as set forth in claim 5 and further comprising a protective cover disposed around said second braided layer.

8. A hose construction as set forth in claim 7 in which said protective cover is in the form of a synthetic plastic cover.

9. A hose construction as set forth in claim 4 in which said electrically conductive layer is made of said carbonaceous particles in the form of carbon black having a size such that 90% thereof are below 7 microns in size.

10. A hose construction as set forth in claim 4 in which said inner tubular layer is made of nylon, said braided layers are made of nylon, and further comprising a protective cover for said hose construction made of a polymeric material, said cover being disposed around said second braided layer.

11. A hose construction as set forth in claim 10 in which said protective cover is made of polyurethane.

12. A method of making a flexible hose construction for dissipating static electricity built up thereon, said method comprising the steps of, providing a polymeric inner tube, braiding a first braided layer against said tube, placing the tube with the first braided layer thereon in contact with a dispersion containing carbonaceous particles disposed therethrough causing said carbonaceous particles to form an electrically conductive layer around said first braided layer and between filaments comprising said first braided layer, braiding a second braided layer around the electrically conductive layer to sandwich the electrically conductive layer between said first and second braided layers, and drying the hose construction.

13. A method as set forth in claim 12 in which said drying step comprises drying said hose construction in a heat tunnel.

14. A method as set forth in claim 12 and comprising the further step of disposing a protective cover around said second braided layer.

15. A method as set forth in claim 14 in which said disposing step comprises extruding a cover made of a polymeric material concentrically around and against said second braided layer.

16. A method as set forth in claim 15 and comprising the further step of air cooling said hose construction to cool said extruded cover.

17. A method as set forth in claim 12 in which said placing step comprises passing the tube with the first braided layer thereon through an aqueous bath which defines said dispersion and is comprised of between 15 and 50 parts by weight of carbonaceous particles, 2 parts by weight of sulfonated surfactant, 0.2 parts by weight of potassium hydroxide, and the balance of 100 parts by weight being water.

18. A method as set forth in claim 17 and comprising the preparation step of forming said dispersion using a ball mill to disperse said carbonaceous particles.

19. A method as set forth in claim 12 in which said placing step comprises spraying the tube with the first braided layer thereon with said dispersion.

20. A method as set forth in claim 12 in which said placing step comprises placing the tube with the first braided layer thereon in contact with a dispersion containing particles of carbon black.

* * * * *